United States Patent [19]

Hedrick

[11] 4,137,083

[45] Jan. 30, 1979

[54] WATER BASED PRINTING INK

[75] Inventor: Ross M. Hedrick, Creve Coeur, Mo.

[73] Assignee: Monsanto Company, St. Louis, Mo.

[21] Appl. No.: 852,641

[22] Filed: Nov. 18, 1977

Related U.S. Application Data

[62] Division of Ser. No. 687,413, May 17, 1976, Pat. No. 4,072,644.

[51] Int. Cl.² ............................................. C09D 11/00
[52] U.S. Cl. ...................................... 106/20; 101/426
[58] Field of Search ........................... 101/426; 106/20

[56] References Cited

U.S. PATENT DOCUMENTS

| | | | |
|---|---|---|---|
| 2,720,461 | 10/1955 | Voet | 106/30 |
| 2,857,365 | 10/1958 | Johnson | 260/78.5 |
| 2,913,437 | 11/1959 | Johnson | 260/78.5 |
| 2,938,016 | 5/1960 | Johnson | 260/78.5 |
| 2,973,285 | 2/1961 | Berke et al. | 260/29.6 H |
| 2,980,653 | 4/1961 | Johnson | 260/78.5 |
| 3,053,814 | 9/1962 | Hedrick | 526/15 |
| 3,165,485 | 1/1965 | Jenyckyj et al. | 260/28.5 R |
| 3,283,033 | 11/1966 | Johnson | 260/878 |
| 3,412,053 | 11/1968 | Pugliese | 260/18 R |
| 3,840,499 | 10/1974 | DiGiulio | 526/15 |
| 3,878,151 | 4/1975 | Dachs et al. | 260/29.6 T |
| 3,993,493 | 11/1976 | McLaren et al. | 106/20 |

OTHER PUBLICATIONS

Pollock, *Paper, Film & Foil Converter*, Sep. 1975, pp. 49 & 50.

Vanderhoff, *Journal of Radiation Curing*, Oct. 1974, pp. 7–21.

*Primary Examiner*—M. J. Welsh
*Attorney, Agent, or Firm*—Sughrue, Rothwell, Mion, Zinn and Macpeak

[57] ABSTRACT

A rapidly drying aqueous printing ink containing a gel forming polymer soluble in the ink but which rapidly gels upon application of the ink to a substrate during a printing process.

12 Claims, No Drawings

WATER BASED PRINTING INK

This is a division of application Ser. No. 687,413, filed May 17, 1976, now U.S. Pat. No. 4,072,644.

BACKGROUND OF THE INVENTION

The present invention relates to printing inks. More specifically the present invention relates to printing inks wherein the principal solvent or vehicle is water, hereinafter denoted water-based and/or aqueous printing inks.

Printing inks are employed in the graphic arts as the medium by which desired colored representations are formed on a surface. The printing ink forms a colored coating in predetermined fashion on the selected substrate. Mechanical means carrying out a printing process applies the ink to the selected surface.

One way to classify inks is according to the type of printing process to be carried out. Certain types of printing processes require relatively viscous inks of a paste-like consistency while others demand inks of an oleophilic nature; still others entail the employment of relatively fluid, quick-drying inks. Letter press, gravure and flexographic printing processes, among others, usually necessitate fast drying inks.

Although inks can dry through one or more mechanisms, such as absorption, evaporation, oxidation, polymerization and the like, most often the evaporation mode is employed for the more fluid inks used in the letter press, flexographic or gravure processes. From a conventional viewpoint, this has led to the use of relatively volatile organic solvents as the ink solvent or vehicle. When the ink is applied to the substrate, the solvent, with the aid of heat where needed, evaporates to leave the dried coloration.

Although water-based printing inks are known, they have not been economically desirable due to the relatively high energy input needed for rapid evaporation. As noted above, volatile organic solvent ink vehicles requiring little or no added energy for quick evaporation at room temperature have been widely used. However, undesired characteristics and disadvantages in their use have led to the consideration of new systems for drying or curing inks. Pollution of the environment by evaporated organic solvents presents obvious health and safety problems. Governmental bodies are imposing strict standards of allowable dissipation into the air. Expensive and complex reclaiming equipment must often be considered to meet the stringent governmental regulations.

A number of approaches have been considered to avoid the pollution problem caused by the rapid drying organic solvents. One such approach is the use of solventless inks, dryable through cross-linking or ultraviolet radiation. Another approach has been the development of infrared drying units to rapidly dry less volatile solvents, such as water. Also, rapidly drying overcoats have been applied to protect slow drying inks while they dry normally. The ink need not dry instantaneously as long as the markings possess sufficient mechanical properties to prevent disfiguration.

The present invention is an approach enabling the use of water as the primary or sole ink vehicle or solvent for a "rapid drying" printing ink formation.

Various polymeric materials, including styrene/maleic anhydride copolymers have been employed as vehicle components in water-based printing inks. See "Inks and Coatings" by Pollock, *Paper, Film and Foil Converter* (September, 1975), page 50. Maleic anhydride copolymers are also known as dispersants for pigments. See, for example U.S. Pat. Nos. 2,980,653, 2,938,016, 2,913,437 and 2,857,365. Cross-linked maleic anhydride copolymers useable in the salt form as thickness in textile pastes are disclosed in U.S. Pat. Nos. 3,878,151, 3,165,485 and 3,283,033.

Maleimide copolymers, such as imides of isobutylene/maleic anhydride interpolymers are well documented in the patent literature. See U.S. Pat. No. 3,053,814 of the same inventor, including discussion of water solubility characteristics thereof. U.S. Pat. No. 3,053,814 states that the imide copolymer above containing a minimal imide content, is soluble in water containing ammonium hydroxide, but upon loss of ammonia the solution gels and the gels dry to water insoluble films. The possibility of using such a copolymer as a rapid drying component in an aqueous or water based printing ink environment is not suggested by the earlier Hedrick patent. Thus, there is still a need for an aqueous-based printing ink which can rapidly dry at room temperature, with acceleration by heating where desired.

It is also known to employ other salt forming polymers as gel-forming agents, for example, in floor waxes. Carboxyl-containing polymers can be dissolved in ammonia solution. As ammonia is lost after drying of the wax, the insoluble carboxylic acid resin forms. However, this type of system usually loses ammonia rather slowly (hence, the floor wax use) and because of this, heat would be necessary to accelerate the drying and insolubilization process. Vanderhoff in "Status of Ultraviolet Light-Cured Printing Inks", *Journal of Radiation Curing*, (October 1974), pp. 7–21, discusses the use of ammonium hydroxide-neutralized alkaline solutions of carboxyl-containing polymers to provide "tack" in water-based inks. As the ink dries through evaporation and/or absorption of the water, the viscosity of the ink increases to provide the "tack", or adherence to the substrate. Ammonia is slowly released to form the water-insoluble carboxylic polymer when the ink is dry. Vanderhoff discusses the "slow drying speed" of these water-based inks. As an ink organic solvent system version of a concept employing resin salt, see U.S. Pat. Nos. 3,412,053 and 2,720,461. In the latter patent, one embodiment involves an organic solvent based ink varnish containing a volatile amine salt of a water-insoluble and organic solvent-insoluble resin, said salt being soluble in the organic solvent based ink varnish. The free resin precipitates upon the printed sheet or is filtered onto the printed sheet through diffusion of the liquid vehicle into the sheet. An ink composed essentially of water as solvent is not considered, nor is there any consideration of a rapid gelling ink.

SUMMARY OF THE INVENTION

An object of the present invention is to provide an improved printing ink.

Another object of this invention is to provide a quick drying printing ink not requiring a volatile organic solvent vehicle.

Still another object of this invention is to provide a quick drying water based printing ink.

Further, an object of this invention is to provide a printing ink suitable for letter press, flexographic, gravure and other types of printing processes wherein a relatively fluid hydrophilic ink can be employed.

Another object of this invention is to provide an aqueous printing ink containing a polymeric additive which remains in solution in the ink prior to printing but rapidly gels after application of the ink to a substrate.

Other objects of the invention will be apparent to the skilled artisan from the detailed description of the invention hereinafter.

The above and other objects of this invention are obtained by an aqueous or water based printing ink containing, in addition to conventional ingredients found in such inks, a rapid removable solubilizing component-dependent gel forming polymer. By "rapid removable solubilizing component-dependent gel forming polymer" is meant a water insoluble polymeric material which is maintained entirely soluble in an aqueous solution by means of interaction or association with solubilizing (usually vaporizable) material but which rapidly gels under ambient conditions to form a water-insensitive film upon being applied as a thin film to a substrate. In other words, as an example, when a very thin layer of the aqueous ink solution as occurs in a printing process is applied to a substrate, a volatile solubilizing component can be quickly released and the polymer reverts to its water-insoluble form. Removal of a solubilizable material most often occurs through evaporation, but other factors such as absorption into the substrate can aid rapid gelling.

In a preferred embodiment of the invention, the above and other objects are obtained by an aqueous printing ink comprising a defined linear, maleimide copolymer, pigment, binder where desired and water.

In a more preferred embodiment of the invention the water insoluble maleimide copolymer is an aliphatic olefin or styrene/maleimide interpolymer containing some non-imide groups derived from maleic anhydride in the form of amide or ammonium salt groups.

At the present time, the most preferred embodiment of the present invention utilizes an isobutylene/maleimide copolymer formed from an isobutylene/maleic anhydride intermediate with about 70 to 90% maleic anhydride groups converted to the imide.

DETAILED DESCRIPTION OF THE INVENTION

The printing ink of the present invention is an aqueous printing ink containing a rapid drying component, previously referred to as the "rapid removable solubilizing component-dependent gel forming polymer", hereinafter for the sake of brevity, denoted "gel forming polymer", A most important characteristic of the ink of this invention is the relatively short time required for "drying". Drying, a term of relative meaning, is used herein (and oftern in the printing arts) as referring to a transitory state along the way to "absolute drying" (essentially complete removal of solvent or vehicle) where the printed matter can be further processed without concern for occurrence of smearing or other disfiguration. As one example of what is meant by "drying" herein, the ink of the present invention forms a non-tacky film which is not disfigured upon rubbing by hand or by contact with additional printed matter substrates even under the pressure conditions encountered during conventional printing processes when the printed substrate is wound about a roll during the printing operation. In general, drying of the inventive ink is 2 to 10 times faster as compared with the same ink formulation without the gel forming polymer on the same substrate.

Although the drying process increases to the above-mentioned degree at room temperature, printing processes often employ a blast of warm air to accelerate the drying process, under which the ink of the present invention will dry even more rapidly.

The principal solvent of the ink of this invention is water. Water will be present in the ink in at least about 75 percent (by volume) and often will form 100% of the liquid portion of the ink formulation. When water does not form the entire liquid portion of the ink, one or more water-miscible solvents will be present. Such other solvents may be used to act as auxiliary film formers, to aid in solubilizing binders, as pigment dispersants and the like. As examples of such other solvents, there may be mentioned glycerin, ethylene glycol and alcohols such as ethanol and isopropanol.

The most important ingredient in the ink from the standpoint of this invention is the gel forming polymer. The gel forming polymer may take a number of forms, but in all variations, the concept of rapid gelation to a water-insensitive film upon rapid removal of a water-solubilizing component is present. Depending upon type of gel forming polymer and solubilizing component, the mode of removal of the component with concomitant insolubilizing of the polymer can vary. However, in all cases, the formation of the water-insensitive film must occur within the time frame discussed above at the temperature prevailing in the vicinity of the substrate during the printing process. Thus, one way to carry out the concept of this invention would be to employ a substrate selectively absorb ontto the solubilizing component. The most convenient form of the invention involves the use of a solubilizing component rapidly volatilized at prevailing temperatures when applied in a thin aqueous film to a substrate. In view of this, the greater portion of the balance of the Detailed Discussion will be directed to gel forming polymers based on the presence of a volatile rapid removal component.

The preferred embodiments of this invention involve the use of a polymer containing extremely weak acid groups. Ammonia or volatile amine is added to the aqueous ink formulations to solubilize the polymer at a high pH. Once the aqueous ink is applied to a substrate in thin film form the ammonia begins to evaporates causing the polymer to revert to the insoluble weak acid form. By "extremely weak acid group" is meant a degree of acidity much less than that of the carboxylic acid group, so that the base is rapidly released. The imide group is such a weak acid group. In fact, the ammonium salt of an imide usually cannot be made in solid form, but only in solution.

It has been found that the water-insoluble maleimide copolymers can usefully be employed as the gel forming polymer. The maleimide copolymer can be solubilized in water with ammonia or an amine of the volatile type. Due to increased surface area, the ammonia or volatile amine quickly evaporates upon printing, causing the polymer to gel in thin film form. The loss of a relatively small percentage of the ammonia present can drop the pH to a level where the maleimide copolymer is insoluble, even though much of the water is still present. This is in contrast to the behavior of salts of carboxyl containing polymers which after air drying and loss of all water are still soluble in water and require longer times and/or highter temperatures to lose ammonia or amines and become converted to the water insoluble acid form.

Maleimide copolymer films are very water insensitive when maleimide units are present. Using isobutylene to exemplify the comonomer, the maleimide copolymer will contain the following repeating unit:

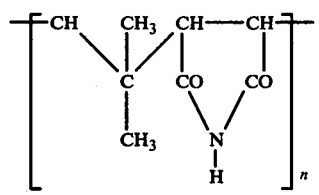

The imide unit imparts water-insolubility to the polymer. Thus, depending upon particular comonomer and number of groups imparting water solubility present in the molecule (most usually maleic anhydride-containing units), the polymer will become water insoluble (and hence a degree of water-insensitivity) at a finite imide content. However, the weakly acidic maleimide moiety can be solubilized in water by salt formation with amine, preferably ammonia, at relatively high pH. It is believed salt formation would occur as follows:

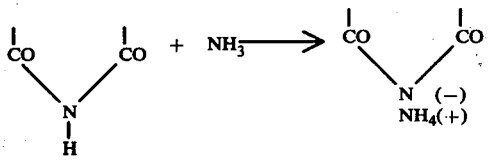

A more detailed consideration of the above-summarized solubility characteristics of the maleimide copolymer can be found in U.S. Pat. No. 3,053,814. As discussed therein, when a volatile amine or ammonia is employed for solvation, reversion to the imide form occurs as the amine volatilizes, resulting in increasing insolubility of the copolymer in water, which manifests itself in the formation of copolymer gels. Quite surprisingly, the gel formation occurs very rapidly in printing processes (probably due to the thinness of the ink film) at even room temperature and provides sufficient mechanical properties of the applied ink to prevent disfiguration through handling, abrasion, and the like. At this point, from a practical standpoint, one can consider the ink as "dried" even though as in the case where protective films are employed, further solvent (water) evaporation will occur.

As usable volatile amines, there may be mentioned the volatile lower alkyl primary, secondary and tertiary amines, volatile heterocyclic amines, i.e. morpholine, volatile tertiary diamines, volatile alkanol-amines, etc.; see U.S. Pat. No. 2,720,461 concerning useable amines, particularly column 3, lines 15–26. Out of this group, ammonia evaporates the quickest. Volatile amine can be used when a slower drying ink is desired. Or, a mixture of amines or ammonia plus one or more amines can be employed to develop drying characteristics not provided by a single amine. The boiling point of the amine will be below 100° C.

The percentage of maleimide groups to impart water insolubility to the copolymer can vary depending upon comonomer(s), molecular weight and the like. The minimum amount required is that which yields a water-insensitive film upon elimination of the volatile amine. See U.S. Pat. No. 3,053,814 regarding level of imide units to be used with isobutylene/maleimide copolymers, with remaining maleic units in the form of the anhydride. It is seen from the table in column 3 of the U.S. Pat. No. 3,053,814 patent that the particular polymer under consideration therein forms a sufficiently water-insensitive film at about 60% maleimide content, corresponding to about 40% maleic anhydride groups as the amide and/or ammonium salt. One can determine solubility characteristics of specific copolymers using the procedures set forth in U.S. Pat. No. 3,053,814 or others known to the skilled artisan.

The amount of gelling polymer in the aqueous ink will primarily depend upon degree of gelation required during the printing process. This amount can be determined through routine trial and error. Since the gel forming polymer can also function as a pigment binder, a larger amount thereof would be employed in such circumstances, while a smaller amount can be used when the gel forming polymer is to function essentially as the rapid drying component. For example, the maleimide copolymers can be employed in an amount of about 0.5 to 20% (wt/vol).

The comonomer(s) is selected to provide acceptable, rapid film forming properties upon gelation without interfering with the solubility characteristics of the polymer. Usable copolymers are $C_3$-$C_8$ aliphatic olefins, such as propylene, butylene, isobutylene, pentene, hexene, etc.; styrene and the polymerizable lower alkyl ($C_1$-$C_4$) substituted styrenes such as α-methylstyrene; the vinyl esters of lower aliphatic ($C_1$-$C_4$) carboxylic acids, such as vinyl acetate, vinyl formate, etc., and vinyl lower alkyl ethers which would form water insoluble copolymers, believed to include vinylmethyl ether, vinylethyl ether, vinylisopropyl ether, vinylbutyl ether, etc. Other comonomers will be apparent to the skilled artisan or may be determined through routine experimentation by testing the solubility and film forming characteristics of the copolymer.

The maleimide copolymer may be formed from the corresponding maleic anhydride copolymer using the processes disclosed in U.S. Pat. No. 3,053,814, or may be directly polymerized from maleimide monomer. In the latter case, it would be desirable to include maleic anhydride as a comonomer. In all cases, the maleic unit is present with one of the previously discussed comonomers. Thus, the maleic unit of the linear copolymer will be in about equimolar amount with the non-maleic-containing comonomer(s). Although a 100% maleimide copolymer (in the context that all maleic units present in the polymer are in the form of the maleimide) is possible, it is very difficult to solubilize such a copolymer. A very concentrated ammonia solution would be needed. Amide and/or ammonium salt functions, i.e.

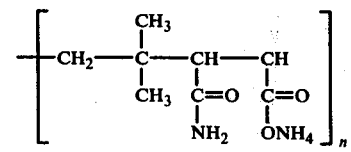

impart water solubility, aiding in solubilizing the polymer. Of course, the number of amide and/or ammonium salt groups must be limited so that the copolymer after application to a printing substrate retains sufficient water-insensitivity. In general, all non-imidated maleic anhydride groups in the polymer will be in the form of the amide and/or ammonium salt.

The molecular weight of the gel forming polymer is limited only by the chemical and physical characteristics thereof in gelled form and the viscosity of the ink. For example, the molecular weight of the maleimide copolymer, as exemplified by the isobutylene copolymer, may range from a few hundred, say about 1000, up to over one million. In general, cross-linking is not desired in the maleimide copolymer.

The substrate to which the ink is applied can vary widely. It can be any to which aqueous printing inks are usually applied, or even those to which aqueous inks are not usually applied, such as relatively hydrophobic surfaces, e.g. polypropylene, polyethylene, latex coated paper, i.e. ethylene/vinylchloride copolymer coated paper. In addition, to coated or non-coated paper, the substrate could be a textile material, film, rope, etc. The type of printing process employed can be any utilizing an aqueous ink. For example, certain types of printing screen processes could be employed in addition to the processes discussed hereinabove.

In addition to the gel forming polymer, the ink of the invention will contain the ingredients usually found in the type of ink under consideration. As far as is known, it is not necessary to modify conventional aqueous ink formulations but only to add the gel forming polymer thereto in the desired amount to utilize the present invention. The only exception would be where ingredients normally employed would be adversely effected by a high pH, when such were employed in the maleimide embodiments of this invention. For example, some of the polymer latice binders such as polyvinyl acetate could not be employed at high pH conditions, although many, such as ethylene/vinylchloride copolymers, could be so used. This type of minor incompatibility will be apparent to the skilled artisan.

With the employment of the maleimide copolymers discussed above, insolubility of the free polymer can be brought about using other pH lowering techniques in addition to or in place of ammonia or volatile amine evaporation. For example, pH could be lowered by use of a carbon dioxide atmosphere or use of an acid substrate, i.e. paper sprayed with acetic acid solution.

A number of advantages in addition to the rapid drying concept are realized in inks of the percent invention due to the gel characteristics. The ink of the present invention yields a denser color (higher "hold out") than comparable ink without the gel forming polymer. More pigment is retained on the surface of the substrate. In addition, a higher surface gloss results since the gel dries as a coherent film without the components of the ink segregating from one another. Because the ink of this invention remains on the surface of the substrate, microwave energy drying could be utilized without heating the substrate.

As an ink-related use of the concept of this invention, the ink of the present invention without pigment and ingredients associated therewith (i.e. essentially gel forming polymer in water) could be applied as an ink overcoat to provide high gloss and to protect a slow drying ink.

The following examples are presented to illustrate the invention:

EXAMPLE 1

In the Example, imide groups are determined based on nitrogen analysis compared with the theoretical for the 100% imide copolymer.

Two inks were formulated to have the same solids content for pigment binding, one of which contains a gel forming polymer of this invention, as follows:

|  | A(grams) | B(grams) |
| --- | --- | --- |
| Water | 58 | 70 |
| Foamaster VL | 1 | 1 |
| Pluronic L-63 | 1 | 1 |
| Cabot 300 R Carbon Black | 15 | 15 |
| Mon flex 4800 | 10 | 18 |
| Gel Forming Polymer | *4 |  |
| NH$_4$OH (28%) | 16 | 5 |

*5.1% based on liquids, 3.7+% based on total weight.

Foamaster VL is an anti-foam agent available from Nopco. Pluronic L-63 is a wetting agent available from BASF-Wyandotte, Cabot 300 R is a carbon black available from Cabot. Monflex 4800, previously available from Monsanto, is a 50% solids latex of ethylene/vinyl chloride copolymer to function as a pigment binder. The gel forming polymer was a linear, alternating copolymer of isobutylene and maleic anhydride converted to contain 73% imide groups.

When the above ink formulations were applied to ethylene/vinyl chloride varnish double coated paper, formulation A dried six times faster than formulation B. On uncoated bond paper, formulation A dried 12 times faster than formulation B.

EXAMPLE 2

A commercial type red ink containing rosin ester which retards drying time was divided into two portions, C and D.

|  | C | D |
| --- | --- | --- |
| ink | 20 grams | 20 grams |
| gel forming polymer | 0.4 grams | — |
| NH$_4$OH (28%) | 0.8 ml | 0.8 ml |
| pH of ink | 9.9 | 9.0 |

The gel forming polymer was a linear, alternating copolymer of isobutylene and maleic anhydride converted to contain 91% imide groups. Ink C dried in one half the time of ink D on clay coated paper.

EXAMPLE 3

Varnish overcoats were prepared as follows: (all amounts are in grams)

FORMULATION 1

Water: 48.0
Monflex: 16.0
NH$_4$OH (28%): 24.0
Gel forming polymer: 12.0

Order of addition was water, Monflex, NH$_4$OH, gel forming polymer with agitation.

FORMULATION 2

Same as formulation 1 except the water, gel forming polymer and NH$_4$OH were agitated overnight and the Monflex was added the following day. In formulations 1 and 2 the gel-forming polymer was a linear, alternating copolymer of styrene/maleic anhydride converted to 70 imide groups.

|   |   |
|---|---|
| Control "A" | |
| Water | 60.0 |
| Monflex 4800 | 16.0 |
| NH$_4$OH (28%) | 24.0 |
| Control "B" | |
| Water | 36.0 |
| Monflex 4800 | 40.0 |
| NH$_4$OH (28%) | 24.0 |
| Control "C" | |
| Water | 48.0 |
| Monflex 4800 | 16.0 |
| NH$_4$OH (28%) | 24.0 |
| SMA-520 | 12.0 |
| (non-imidized styrene/maleic anhydride copolymer) | |

| Formula No. | pH | Comparative Viscosity | % Solids | Gel Time in Seconds 1* | 2 | 3 | Coating Gloss |
|---|---|---|---|---|---|---|---|
| 1 | 10.7 | Similar to Karo Syrup (>50 wt oil) | 20 | 7.0 | 4.0 | 5.5 | High gloss |
| 2 | 10.6 | " | 20 | 5.5 | 5.5 | 4.0 | Med. gloss |
| Control A | 11.2 | water | 8 | 5.0 | 11.0 | 20.0 | Flat |
| Control B | 11.1 | water | 20 | 5.0 | 13.0 | 18.5 | Flat |
| Control C | 10.4 | similar to 30–40 wt oil | 20 | 21.0 | 25.0 | 16.0 | Flat |

*1 Bond paper - Substance 20 - White long grain
2 Uncoated solid sulfate board
3 Ethylene/Vinyl chloride coated paper board All of the above were drawn down with a #8 wire wound rod. Variations of the invention will be apparent to the skilled artisan.

I claim:

1. A printing process wherein a fast drying protective overcoat is applied over a slow drying ink, the improvement wherein said overcoat is an aqueous based solution comprising water and a polymer solubilized in said water by a rapid removable solubilizing component, said polymer being capable of forming a water-insensitive gel film upon removal of said rapid removable solubilizing component.

2. The process of claim 1 wherein said polymer is a maleimide copolymer solubilized by ammonia, a volatile amine or a mixture thereof.

3. The process of claim 1 wherein the aqueous based solution is at least 75% by volume water.

4. The process of claim 1 wherein the aqueous based solution is 100% by volume water.

5. The process of claim 2 said copolymer contains one or more comonomers selected from the Group consisting of C$_3$-C$_8$ aliphatic olefins, styrene or the polymerizable lower alkyl substituted styrenes, the vinyl esters of lower aliphatic carboxylic acids and the vinyl lower alkyl ethers.

6. The process of claim 2, the solution containing 0.5 to 20% maleimide copolymer (wt/vol, based on volume of ink).

7. The process of claim 2 wherein said copolymer has a molecular weight of 1,000 to over 1 million.

8. The process of claim 5 wherein said comonomer is a C$_3$-C$_8$ aliphatic olefin.

9. The process of claim 5 wherein said comonomer is styrene.

10. The process of claim 8 wherein said comonomer is isobutylene.

11. The process of claim 10 wherein said copolymer is formed from a maleic anhydride copolymer by converting 70 to 90% of the maleic anhydride groups to the imide.

12. The process of claim 5 wherein said copolymer contains sufficient maleimide units to impart said water-insensitivity with additional maleic anhydride units present as the half amide and/or ammonium salt.

* * * * *